United States Patent
Andermatt et al.

(10) Patent No.: US 7,357,656 B2
(45) Date of Patent: Apr. 15, 2008

(54) ELECTRICAL ENERGY DISCONNECTION DEVICE

(75) Inventors: Ernst Andermatt, Teufenthal (CH); Andre Doessegger, Oberentfelden (CH); Karsten Pohlink, Unterentfelden (CH)

(73) Assignee: Areva T&D AG, Oberentfelden (CH)

( * ) Notice: Subject to any disclaimer, the term of this patent is extended or adjusted under 35 U.S.C. 154(b) by 76 days.

(21) Appl. No.: 11/121,955

(22) Filed: May 5, 2005

(65) Prior Publication Data

US 2005/0258140 A1    Nov. 24, 2005

(30) Foreign Application Priority Data

May 18, 2004   (FR)   ................................. 04 50979

(51) Int. Cl.
*H01R 13/64* (2006.01)
(52) U.S. Cl. ...................................... 439/247; 439/289
(58) Field of Classification Search ................ 439/719, 439/310, 289, 247; 218/89; 200/534
See application file for complete search history.

(56) References Cited

U.S. PATENT DOCUMENTS

| | | | | |
|---|---|---|---|---|
| 2,265,998 A | * | 12/1941 | Bruno | ........................ 200/51.1 |
| 3,710,247 A | * | 1/1973 | Kessler et al. | ................. 324/96 |
| 3,842,228 A | * | 10/1974 | Green | ......................... 218/117 |
| 3,964,814 A | * | 6/1976 | Kalbitz et al. | ............... 439/248 |
| 4,371,175 A | * | 2/1983 | Van Dyk, Jr. | ................ 174/357 |
| 4,731,502 A | * | 3/1988 | Finamore | ................... 174/74 R |
| 5,283,393 A | * | 2/1994 | Guginsky | ............... 174/102 R |
| 5,298,703 A | * | 3/1994 | Yatsuzuka et al. | ............ 218/44 |
| 5,380,224 A | * | 1/1995 | DiCicco | ..................... 439/610 |
| 6,105,620 A | * | 8/2000 | Haberl | ........................ 138/118 |
| 6,717,089 B1 | | 4/2004 | Azzola et al. | |
| 2003/0119382 A1 | * | 6/2003 | Narusevicius et al. | ....... 439/874 |

* cited by examiner

*Primary Examiner*—Tho D. Ta
*Assistant Examiner*—Travis Chambers
(74) *Attorney, Agent, or Firm*—Oblon, Spivak, McClelland, Maier & Neustadt, P.C.

(57) ABSTRACT

A disconnection device is designed to separate a first portion of an electrical circuit electrically from a second portion of said circuit, the disconnection device including: at least one pair of contacts, one of which contacts is a moving contact, the pair of contacts having an open state and a closed state and a flexible conductor fixed at one end to the moving contact and serving to be fixed at the other end to one of the portions of the electrical circuit. The conductor comprises a flexible tube that is electrically conductive, at least at a surface portion thereof, and that has bending stiffness that is low enough to enable it to bend without kinking, and torsion stiffness that is high enough to enable it to take up a shape and a position that are substantially reproducible at least in the closed state. The device is used in particular in gas-insulated high-voltage electricity substations.

23 Claims, 5 Drawing Sheets

ELECTRICAL ENERGY DISCONNECTION DEVICE

TECHNICAL FIELD

The invention relates to an electrical energy disconnection device. The term "electrical disconnection device" is used to cover a disconnector, a circuit-breaker, a grounding device, or a switch.

The invention relates more particularly to a simplified high-voltage disconnector which is capable of separating and/or of interconnecting two portions of high-voltage circuit that have a low working current (e.g. less than 1 amp). Such an item of switchgear operates turned-off. It is recalled that a disconnector is a device designed to isolate a portion of an electrical circuit from the rest of the circuit, it being desired to take said portion out of operation or to work on it or to take measurements on it without danger. Such a disconnector can be used, in particular for electrically isolating a voltage transformer included in a gas-insulated substation (GIS) from the rest of the substation. When testing the value of the voltage, it can be desired to separate the voltage transformer from the rest of the gas-insulated substation.

In the electricity transport and distribution network sense, high-voltages are voltages greater than about 35,000 volts to about 36,000 volts (lower voltages are considered to be medium-voltage).

An electricity substation is an installation situated at the junction between electricity transport lines and electricity distribution lines. It contains, in particular, protection, transformation, and disconnection equipment serving to modify certain characteristics of the electricity grid to which it is connected, as a function of operating constraints.

STATE OF THE PRIOR ART

Various solutions exist for separating a voltage transformer from the rest of a high-voltage gas-insulated electricity substation. It is possible to insert a high-voltage disconnector between the primary winding (on the higher voltage side) of the voltage transformer and the rest of the gas-insulated electricity substation. That solution is expensive, however, because not all of the characteristics of the disconnector are used. For example, it is not necessary to disconnect and to re-connect the transformer on-load.

Another solution used in medium-voltage applications is to add at least one simplified disconnection device 3 to the transformer 1.1 that is part of a gas-insulated electricity substation 1 as shown in FIG. 1. The disconnection device 3 then acts as a disconnector. It is either in a closed state, or in an open state. The electricity substation 1 is housed in a gastight and generally metal enclosure 4 that is designed to be filled with insulating gas, e.g. sulfur hexafluoride $SF_6$.

The transformer 1.1 is situated in a first portion 4.1 of the gastight enclosure 4. The rest of the electricity substation, diagrammatically represented in FIG. 1 by a conductor 1.2., is situated in another portion 4.2 of the gastight enclosure 4.

The transformer 1.1 has one or more sets of windings W with, for each set, a primary winding (on the higher voltage side) and at least one secondary winding (on the lower voltage side). In the figure, it is not possible to distinguish the primary winding from the secondary winding. The windings are given overall reference letter W. Single-phase transformers have only one set of windings, and multi-phase transformers have a plurality of sets of windings. In the example shown in FIG. 1, it is assumed that the transformer is three-phase, but only one set of windings W can be seen.

The disconnection device 3 is housed in the first enclosure portion 4.1, which portion surrounds the transformer 1.1. A dielectric partition 5 separates the first portion 4.1 of the gastight enclosure 4 from the other portion 4.2 that surrounds the rest 1.2 of the gas-insulated electricity substation.

The disconnection device 3 has one or more pairs 6 of contacts 6.1, 6.2. The number of pairs 6 of contacts corresponds to the number of phases of the transformer. Each pair 6 comprises a fixed contact 6.1 and a moving contact 6.2. The fixed contact 6.1 serves to be connected to the rest 1.2 of the gas-insulated electricity substation 1 via a plug-in contact 7. The plug-in contact 7 is plugged into the dielectric partition 5.

The moving contact 6.2 is designed to be connected to the primary winding W of the transformer 1.1. It moves to open or close the disconnection device 3. It is secured to a dielectric flexible blade 8. The dielectric flexible blade 8 has a fixed end 8.1 and a free end 8.2. It is connected between the two ends of an actuating rod 9 that is accessible from the outside of the first enclosure portion 4.1. The actuating rod 9 moving causes the flexible blade 8 to move, and thus enables the moving contact 6.2 of each pair to be put into contact with or to be separated from the fixed contact 6.1 of the pair. The dielectric flexible blade 8 acts as a spring to guarantee electrical contact.

The rod 9 is suitable for being locked in two end positions in which the disconnection device 6 is either in an open state, or in a closed state. The moving contact 6.2 is electrically connected to the primary winding W of the transformer by a flexible conductor 10 having non-insulated strands. The length of the conductor 10 is greater than the gap, in a pair 6, between the moving contact 6.2 and the point at which the conductor is fixed to the winding when the pair is in the closed position. Regardless of whether the disconnection device 6 is in the open state or in the closed state, the conductor 10 follows a curve whose movements are random.

The drawback with that configuration is that it is not reliable for high-voltage applications. The voltage gradient at the surface of the conductor 10 is then very steep. During handling, the shape of the curve and its position are not stable and reproducible. It is not possible to know in advance the exact position that the conductor 10 will take up. It might find itself in the vicinity of a grounded zone or of another conductor that is live. If they are separated by a gap that is too small for the voltage gradient, there is a risk of electric arcs striking between the conductor 10 and the grounded zone or between two conductors. Destruction of the disconnection device 3 can then ensue.

SUMMARY OF THE INVENTION

An object of the present invention is to propose an electrical energy disconnection device that does not suffer from the above limitations and difficulties.

A particular object is to propose a simplified electrical energy disconnection device that is reliable at high voltage.

Another object of the invention is to propose a disconnection device that is inexpensive and compact.

In order to achieve these objects, the invention provides more precisely a disconnection device designed to separate a first portion of an electrical circuit electrically from a second portion of said circuit, the disconnection device comprising:

at least one pair of contacts, one of which contacts is a moving contact, the pair of contacts having an open state and a closed state; and a flexible conductor fixed at one end to the moving contact and serving to be fixed at the other end to one of the portions of the electrical circuit, said disconnection device being characterized in that:

the conductor comprises a flexible tube that is electrically conductive, at least at its surface, and that has bending stiffness that is low enough to enable it to bend without kinking, and torsion stiffness that is high enough to enable it to take up a shape and a position that are substantially reproducible, at least in the closed state.

In order to enable the tube to bend without kinking, it is preferable for its minimum allowable radius of curvature to be less than or equal to about three times the outside diameter of the flexible tube.

In order to enable the tube to take up the correct position at least in the closed state, when the moving contact is built around a first axis, it is preferable for each end of the flexible tube to be fixed along a second axis that is substantially parallel to or that coincides with the first axis, the two second axes being offset relative to each other.

For the same purpose, the length of the flexible tube is greater than a distance between a point at which the flexible tube is fixed to the moving contact and a point at which the flexible tube is fixed to the electrical circuit portion when the pair of contacts is in the closed state.

In order to prevent undesirable electric discharges from occurring, it is preferable for the outside diameter of the flexible tube to lie approximately in the range 10 millimeters (mm) to 60 mm.

The flexible tube may be formed of a flexible tubular body and of an outer sheath made up of interlaced wires.

The tubular body may be made of metal, it may be made of a plastics material, it may be corrugated, and it may be covered with a conductive layer.

The sheath is made of metal.

At least one of the ends of the flexible tube is equipped with a fixing fitting.

The fitting may also be a screw-on fitting.

The fixing fitting may be provided internally with a pivotally mounted bushing, thereby enabling the flexible tube to twist suitably when its radius of curvature varies when the moving contact moves.

In one embodiment, the movement of the moving contact is directed substantially along its axis.

In a variant, the movement of the moving contact may take place in a direction substantially perpendicular to its axis.

In order to enable the moving contact to be moved, said moving contact may be mounted on a dielectric support in the form of a substantially cylindrical bar suitable for being moved along its axis.

The present invention also provides a voltage transformer having, inside an enclosure, at least one set of windings and an electrical energy disconnection device as characterized above.

Displacement means for displacing the moving contact are accessible from the outside of the enclosure.

The transformer may be a single-phase transformer, and a multi-phase transformer.

The present invention also provides a gas-insulated electricity substation which, inside a gastight enclosure, has at least one voltage transformer as characterized above, a portion of the gastight enclosure serving as an enclosure for the voltage transformer.

The other contact of the pair of the disconnection device is a fixed contact mounted on a dielectric partition which separates the portion of the gastight enclosure that serves as an enclosure for the voltage transformer from the rest of the gastight enclosure.

BRIEF DESCRIPTION OF THE DRAWINGS

The present invention will be understood more clearly on reading the following description of embodiments given merely by way of indication and by way of non-limiting example, with reference to the accompanying drawings, in which.

Portions of the various figures described below that are identical, similar, or equivalent are given like numerical references in order to facilitate going from one figure to another.

The various portions shown in the figures are not necessarily drawn to a uniform scale, so as to make the figures more legible.

DETAILED DESCRIPTION OF PARTICULAR EMBODIMENTS

Figure 2A:
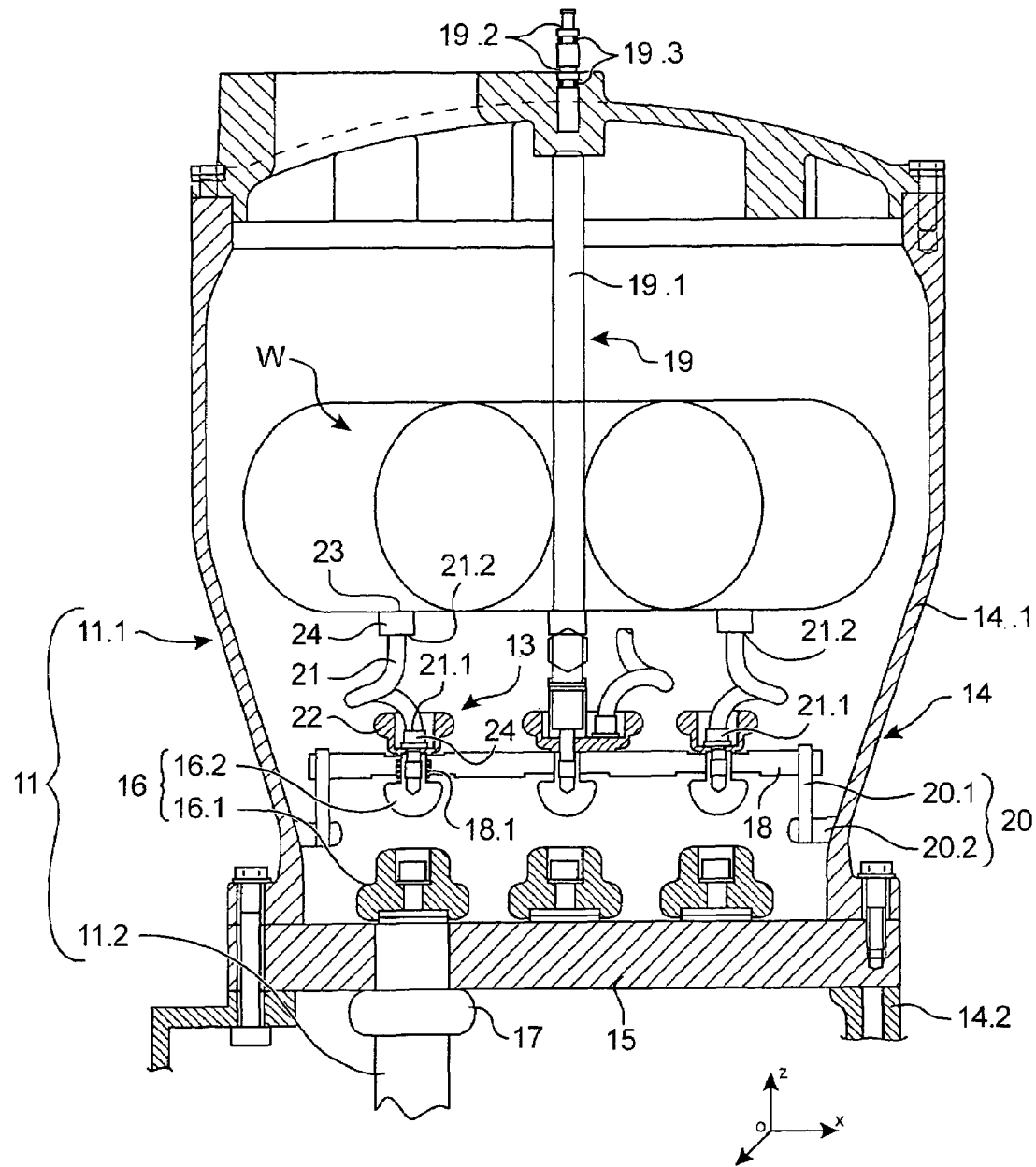
FIGS. 2A and 2B show a first embodiment of a disconnection device of the invention respectively in its open state and in its closed state.
Figure 2B:
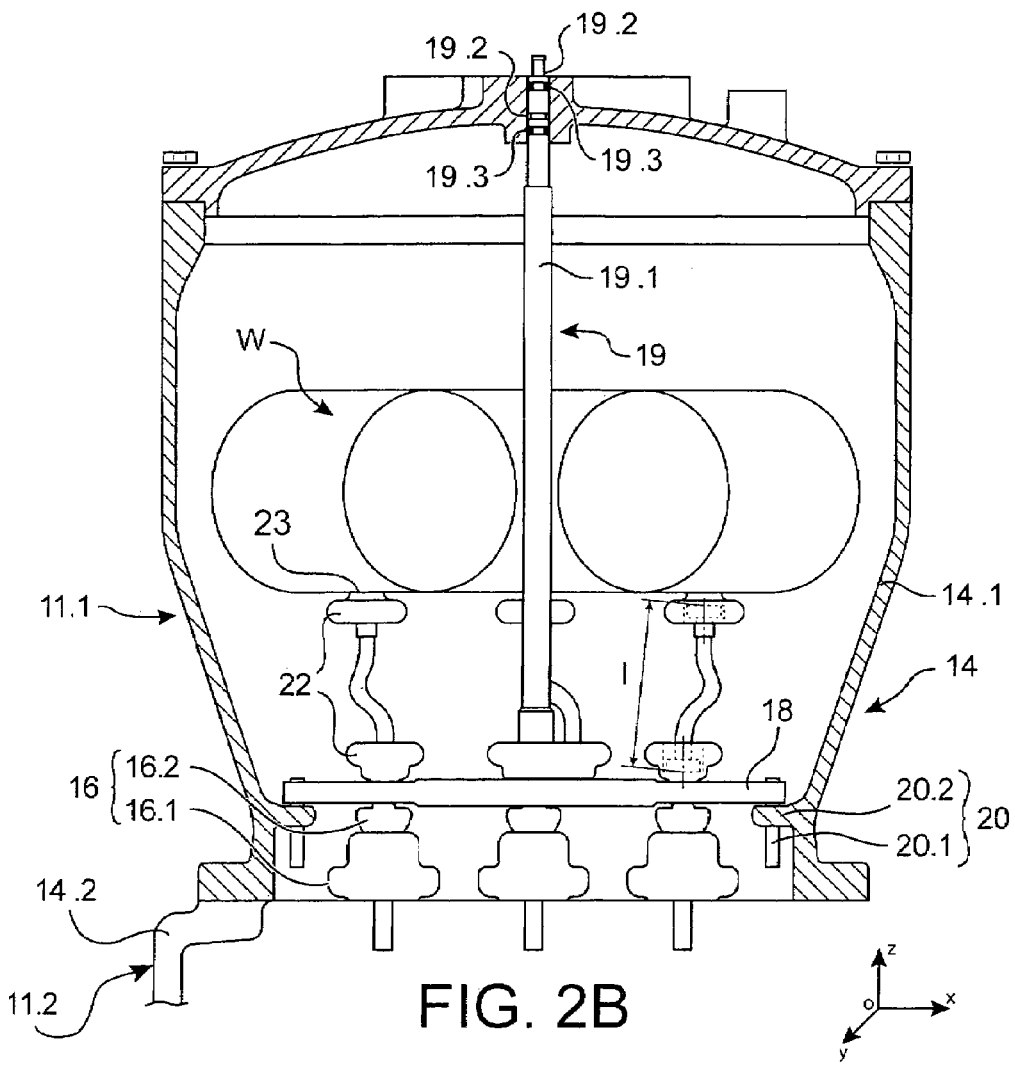

Reference is made to FIGS. 2A and 2B which show a first embodiment of a disconnection device of the invention, respectively in an open state and in a closed state. The disconnection device is designed to separate a first portion 11.1 of a high-voltage electrical circuit 11 electrically from a second portion 11.2 thereof.

In this example, the first portion 11.1 of the electrical circuit is represented diagrammatically by a voltage transformer. The electrical circuit 11 is a portion of a high-voltage gas-insulated electricity substation. The second portion 11.2 of the electrical circuit 11 is connected to the rest of the electricity substation by a conductor represented diagrammatically by a cylindrical busbar.

Other applications for the disconnection device of the invention are naturally possible.

The electrical circuit 11 is placed in a gastight enclosure 14 designed to be filled with an insulating gas, e.g. sulfur hexafluoride $SF_6$.

The transformer 11.1 is situated in a first portion 14.1 of the gastight enclosure 14. The rest of the electrical circuit 11.2 is situated in the other portion 14.2 of the gastight enclosure 14. As in the preceding example, the transformer 11.1 has one or more sets of windings W with, for each set W, a primary winding and at least one secondary winding. In this example, it is also assumed that the transformer 11.1 is three-phase, only two of the sets W of windings being visible, the third set of windings being masked. In such a voltage transformer, the sets of windings W are arranged in a triangular layout substantially in the middle portion of the first portion of the enclosure 14.1. If there is only one set of windings, said set is located substantially in the center of the middle portion of the first portion of the enclosure 14.1.

The disconnection device 13 of the invention is also housed in the first portion 14.1 of the enclosure 14. A gastight dielectric partition 15 separates the first portion 14.1 of the gastight enclosure 14 from the other portion 14.2 of the gastight enclosure 14. The partition 15 serves as a bottom for the first portion of the enclosure 14.1. It extends substantially in the plane xoy.

The disconnection device 13 has one or more pairs 16 of contacts 16.1, 16.2. The number of pairs of contacts is equal to the number of phases of the transformer. Three pairs of contacts can be seen in FIGS. 2A and 2B. Each of the pairs 16 of contacts comprises a fixed contact 16.1 and a moving contact 16.2. When the contacts 16.1 and 16.2 of a pair are in electrical contact, the pair 16 of contacts is in a closed state, as is the disconnection device (FIG. 2B). When the contacts 16.1 and 16.2 of a pair are separated from each other, the pair 16 is in an open state, as is the disconnection device (FIG. 2A).

The fixed contact 16.1 of a pair is designed to be connected electrically to the rest 11.2 of the gas-insulated electricity substation 11 via a plug-in contact 17. The plug-in contact 17 and the fixed contact 16.1 are fixed on the dielectric partition 15. The fixed contact 16.1 is shaped in a manner suitable for being compatible with the requirements for insulating the electricity substation, and with the value of the DC electrical current that is to flow through it (e.g. 0.1 amps (A) or 0.01 A). The fixed contact 16.1 is built about an axis extending along z.

The moving contact 16.2 of a pair 16 is fixed to a rigid dielectric support 18 in the form of a cross-piece. In this embodiment, it faces the fixed contact 16.1 of its pair regardless of the state of the disconnection device. It is also built about an axis extending along z. The fixed and moving contacts 16.1, 16.2 of a pair 16 are in alignment about the same axis.

The moving contact 16.2 is fixed on the support 18 resiliently for the purpose of adjusting the contact force generated when the moving and fixed contacts of a pair are closed. Such resilient fixing can be achieved via a helical spring 18.1, which makes the moving contact 16.2 retractable.

The dielectric support 18 co-operates with displacement means 19 for displacing the moving contact 16.2. The displacement means 19 comprise a rod 19.1 having one end connected to the dielectric support 18 and its other end accessible from the outside of the first portion 14.1 of the enclosure 14. The rod is designed to be pushed or pulled in reciprocating motion between two end positions along the axis z. When it is pushed, the disconnection device is put into its closed state. When it is pulled the disconnection device is put into its open state. The end of the rod 19.1, which is accessible from the outside, can be coupled to a suitable tool (not shown), e.g. of the handle type, in order to facilitate actuation. Actuation can be manual via the tool. The rod 19.1 is situated substantially in the center of the first enclosure portion 14.1 and it passes between the sets W of windings arranged in a triangular layout or more generally disposed along the wall of the first enclosure portion 14.1.

Sealing means 19.3 are provided for maintaining gastightness where the rod exits from the enclosure.

In this example, the dielectric support 18 extends in the plane xoy of a reference frame (o,xyz), and the rod extends substantially perpendicularly to the dielectric support plane 18, i.e. along the z-axis. The displacement means 19 can be equipped with locking means 19.2 for locking the support 18 in the two end positions, each of which corresponds to a respective one of the two states of the disconnection device 16. The locking can take place by means of grooves 19.2 provided around the rod 19.1, the edge of the hole in the first enclosure portion via which the rod 19.1 exits being received in a groove 19.2.

The support 18 is equipped with guide means 20. The guide means 20 can be located at both ends of the support 18 and they can be implemented by peg-and-recess sets, the peg and the recess of each set sliding one in the other. The pegs 20.1 can be secured to the support 18 and the recesses 20.2 can be carried by the wall of the first portion of the enclosure 14.1, or vice versa.

A flexible tube 21 that is electrically conductive, at least at its surface, is fixed to a first end 21.1 of the moving contact 16.2 of each pair of contacts 16, and serves to be fixed at a second end 21.2 to a primary winding W (on the higher voltage side) of the voltage transformer 11.1 via a terminal 23. The first end 21.1 of the flexible tube 21 and the moving contact 16.2 are situated on opposite faces of the support 18. The flexible tube 21 serves to connect the primary winding W of the voltage transformer 11.1 electrically to the moving contact 16.2 of the disconnection device 16. At least one of the ends 21.1 of the flexible tube 21 is protected by a shielding screen 22 which surrounds it and whose suitable shape makes it possible to control the electric field thereat. There is only one screen 22 in FIG. 2A, whereas there are two such screens in FIG. 2B.

The flexible tube 21 has bending stiffness that is low enough to enable it to bend resiliently without kinking, and torsion stiffness that is high enough to enable it to take up a shape and a position that are substantially reproducible at least when the pair 16 of contacts are in the closed state and thus when the disconnection device is in the closed state. It is preferable for the shape and the position also to be substantially reproducible when the disconnection device is in the open state.

Figure 1:
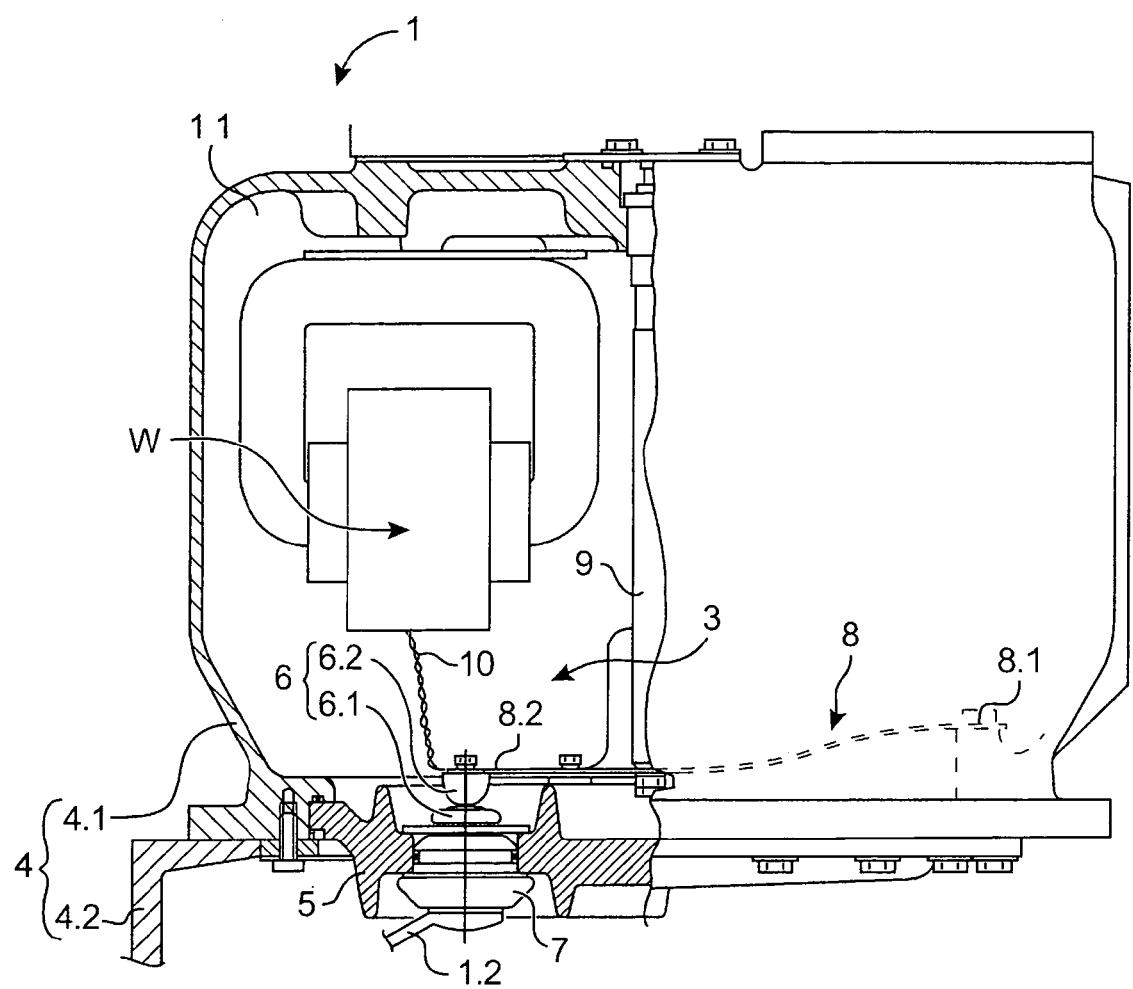
FIG. 1 shows a prior art disconnection device mounted in a medium-voltage voltage transformer.

This reproducibility does not exist in the prior art interrupting devices such as the device shown in FIG. 1. That absence of reproducibility makes those disconnection devices unreliable.

The minimum allowable curvature of the flexible tube 21 is less than or equal to three times its outside diameter. The flexible conductor 21 follows a "natural" curve having a large radius of curvature between its two ends when the disconnection device is closed, and a "forced" curve having a smaller radius of curvature when the disconnection device is open. In such a forced position, the radius of curvature taken up by the flexible tube 21 is greater than the minimum radius of curvature.

At each of its ends 21.1, 21.2, the flexible tube 21 is fixed along an axis that is parallel to or that coincides with the axis of the moving contact 16.2 to which it is connected. An offset exists between the axis of the first end 21.1 and the axis of the second end 21.2 of the flexible tube 21. In this embodiment, the offset is substantially constant regardless of the state of the disconnection device. The offset can lie in the approximate range 4 times the outside diameter of the flexible tube 21 to 10 times the outside diameter of the flexible tube 21. The length of the flexible tube 21 is slightly longer than the distance I between the moving contact 16.2 and the point at which the flexible tube 21 is fixed to the winding W when the disconnection device is closed. Typically, this length is approximately in the range 1.1 times the value of the distance I to 1.2 times the value of the distance I. In a three-phase configuration, the three terminals 23 for fixing to the windings are disposed in a triangular layout in the plane xoy. The distance I shown in FIG. 2B is a projection on the plane zox.

The length of the flexible tube and the offset are optimized so that the tube follows the natural curve when the disconnection device is closed, and the forced curve when the disconnection device is open.

Figure 3:
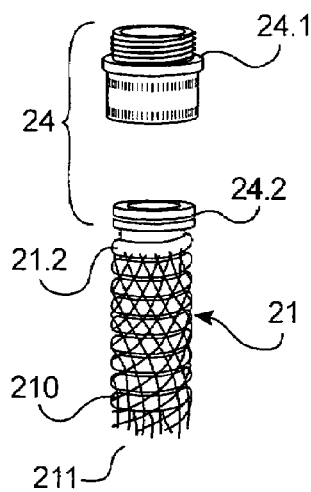
FIG. 3 shows an embodiment of the flexible tube.

FIG. 3 shows an example of a flexible tube 21. The flexible tube can be formed of a flexible tubular body 210 that is externally covered with a sheath 211 of interlaced wires. The wires are metallic. The tubular body 210 can be corrugated and formed of a helically-wound profile, it being possible for said profile to be obtained from galvanized cold rolled steel strip. The wires of the sheath 211 can also be made of galvanized or tinned steel, or of tinned copper. The sheath 211 imparts good and substantially constant electrical conductivity to the tube. For example, it is possible to use protective tubes that are commercially available and that can be used in hydraulic or pneumatic applications or for protecting low-voltage wires and cables.

In a variant, the flexible tube can be made of a dielectric material, e.g. of a plastics material externally covered with a conductive material such as interlaced tinned copper wires, or of a plastics material covered with a thin conductive layer.

The outside diameter of the flexible tube is chosen to be large enough to prevent the flexible tube from being the seat of partial discharges. This does not apply in the prior art because a single stranded cable provided the connection between the moving contact of the disconnection device and the voltage transformer. Typically the outside diameter of the flexible tube lies in the approximate range 10 mm to 60 mm.

The disconnection device is adapted for applications having low working currents, e.g. lower than one tenth of an amp if the conductive surface has resistance less than 0.1 ohms per meter ($\Omega$/m). For equal conductive sectional areas, the flexible tube of the disconnection device of the invention has an outside surface area that is much larger than outside surface area of the stranded conductor of the disconnection device of FIG. 1. There is therefore less risk of generating undesirable electric discharges.

At least one end 21.1, 21.2 of the flexible tube 21 can be equipped with a screw-on fitting 24. In FIG. 3, a single fitting 24 is shown. The fitting is fixed to the flexible tube 21 by being screwed therein, and it is fixed either to the terminal of the winding 23 or to the moving contact 16.2 by being screwed therein. The fitting 24 is electrically conductive, advantageously made of brass, so as to connect the flexible tube 21 both mechanically and also electrically. The fitting 24 can advantageously be in two portions. A first portion forms the body 24.1 of the fitting, and it serves to be screwed into the terminal of the winding or into the moving contact. The second portion is a bushing 24.2 serving to be screwed into the flexible tube 21 and to be snap-fastened into the body 24.1. The bushing 24.2 can be pivotally mounted so as to allow a little freedom for the flexible tube 21 so that it can twist so as to make it easier for it to bend while the disconnection device is opening and to straighten while it is closing. The term "straighten" does not necessarily mean that the tube becomes rectilinear, but rather that is less curved.

Figure 4A:
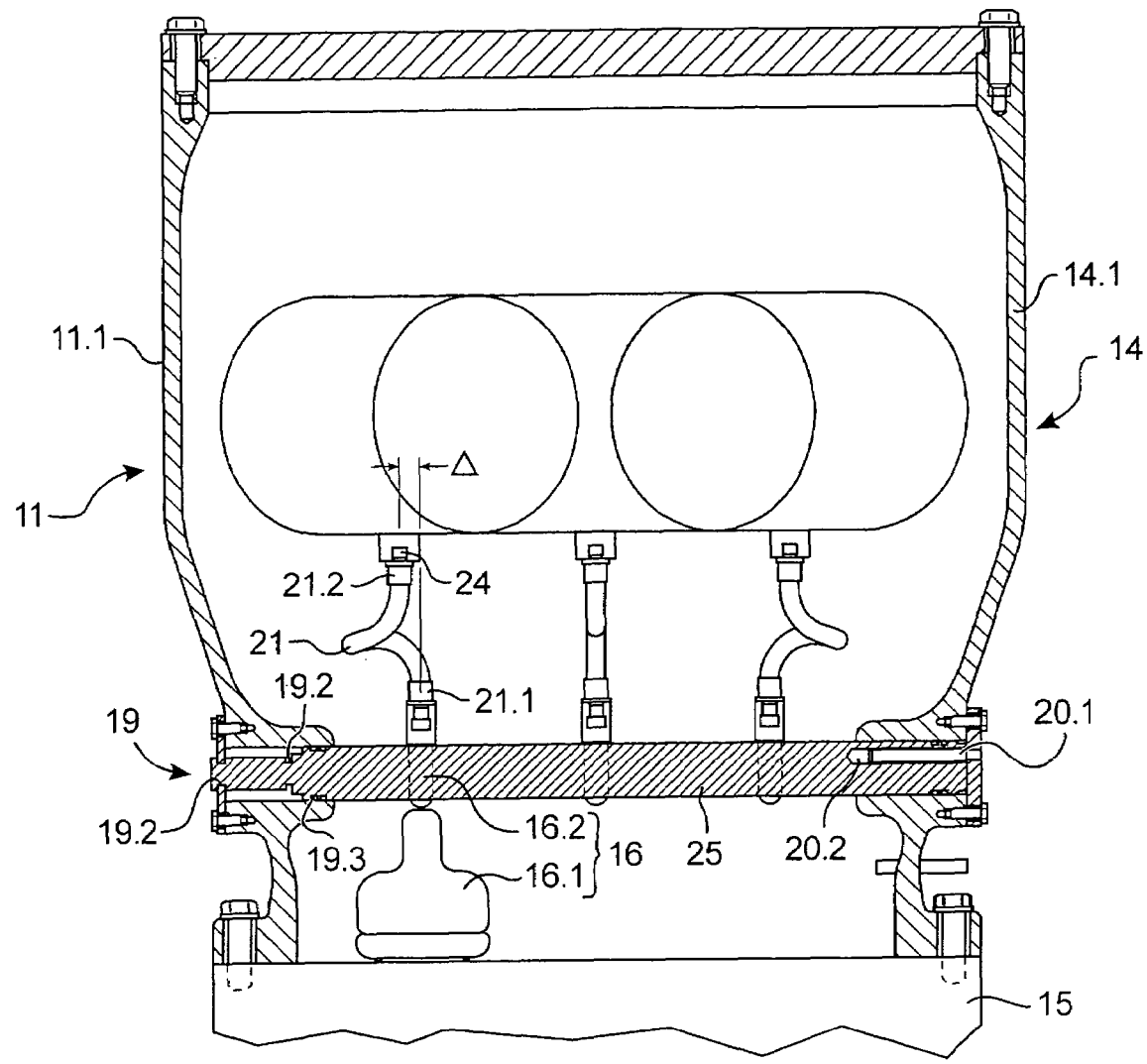
FIGS. 4A and 4B show a second embodiment of a disconnection device of the invention respectively in its closed state and in its open state.
Figure 4B:
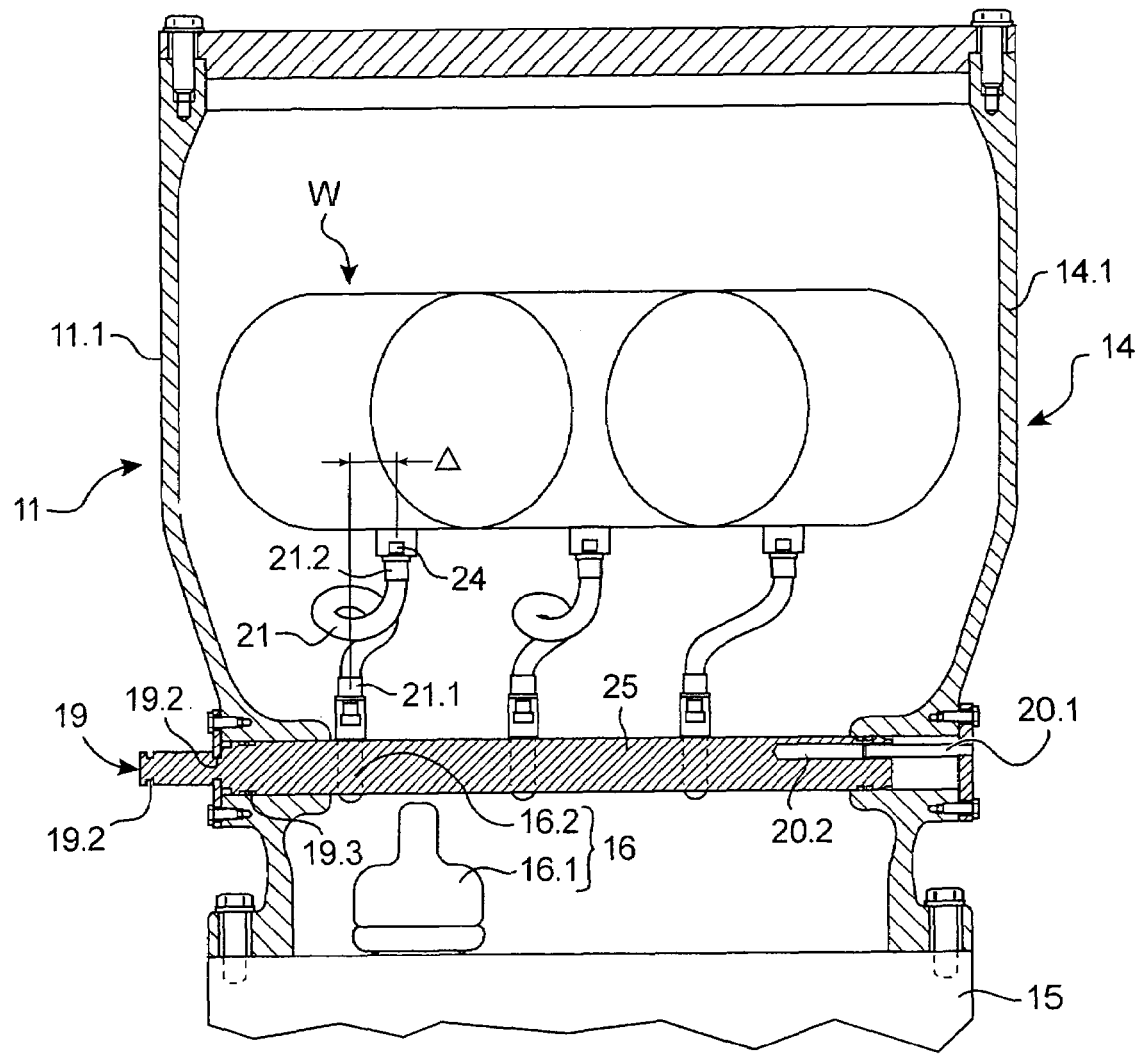

FIGS. 4A and 4B diagrammatically show another embodiment of a disconnection device of the invention also in a disconnector application. These figures are derived from FIGS. 2A and 2B. Certain elements are not shown in them for reasons of simplification. In particular, the plug-in contact, the rest of the gastight enclosure, and the second portion 11.2 of the electrical circuit 11 are not shown.

In FIG. 4A, the disconnection device is closed, and in FIG. 4B, it is open. The main difference relative to the embodiment of FIGS. 2A and 2B lies in the level of movement to which the moving contact 16.2 is subjected when the disconnection device goes from one state to another. Instead of the movement being a movement in a direction substantially parallel to the axis of the fixed contact 16.1, the movement is substantially perpendicular to said axis.

The moving contact 16.2 is secured to a dielectric support 25 which, in this embodiment, is in the form of a substantially cylindrical bar.

The axis of the moving contact is substantially perpendicular to the axis of the bar 25. But, the support 25 is suitable for moving along its axis (in this example, along the x-axis) in reciprocating motion between the two end positions.

The axes of the fixed and moving contacts no longer coincide when the disconnection device is in its open state. They are substantially parallel.

The support 25 has one end that is accessible from the outside of the first enclosure portion 14.1 dedicated to the voltage transformer 11.1. One or more sealing gaskets 19.3 are provided at the outlet via which the support 25 exits from the enclosure.

The other end of the support 25 is situated in the first enclosure portion 14.1, it is equipped with guide means 20 which prevent the bar 25 from turning. The guide means can consist in at least one peg-and-recess set, the recess 20.2 being carried by the support 25 and the peg 20.1 being carried by the wall of the first enclosure portion 14.1 or vice versa.

In this embodiment, the actuating rod is no longer necessary. The support 25 can be actuated directly from the outside of the first enclosure portion 14.1. In a variant, a part extending the support 25 can be used. On the side accessible from the outside of the first enclosure portion 14.1, the support 25 can have locking means 19.2 in order to hold it in the end positions. Said locking means 19.2 can be in the form of grooves, for example. This configuration is preferred in single-phase voltage transformers.

In FIG. 4A, the support 25 is pushed into the first enclosure portion. Each moving contact 16.2 is in electrical contact with the fixed contact of its pair. The pair of contacts is in its closed state. The two ends 21.1, 21.2 of the flexible tube 21 are fixed along axes extending along z, and an offset $\Delta$ exists between the two axes. In a three-phase configuration, the three fittings 24 are disposed in a triangular layout in the plane xoy. The offset $\Delta$ shown in FIGS. 4A and 4B is a projection along the x-axis. In FIG. 4B, the support 18 has been pulled leftwards, and the moving contact 16.2 of each pair 16 has been shifted leftwards. The pair 16 of contacts is in its open state. The offset $\Delta$ between the axes of the two ends 21.1, 21.2 of the flexible tube 21 has varied but an offset remains. The curvature of the flexible tube 21 has also varied from one disconnection device state to the other.

This embodiment is preferred in single-phase applications because of the fact that the rod which extends along the z-axis in the central portion of the first enclosure portion is omitted.

This embodiment can naturally be used in multi-phase applications.

A disconnection device of the invention is particularly inexpensive because it uses only a few elements. The fact that a commercially-available flexible tube is used contributes to this low cost.

The present invention is not limited strictly to the embodiments described, which are merely examples.

The invention claimed is:

1. A disconnection device designed to separate a first portion of an electrical circuit electrically from a second portion of said circuit, the disconnection device comprising:
   at least one pair of contacts, one of which contacts is a moving contact, the pair of contacts having an open state and a closed state; and
   a single flexible conductor fixed at one end to the moving contact and serving to be electrically connected at the other end to one of the portions of the electrical circuit, said disconnection device being wherein:
   the conductor is a flexible tube that is electrically conductive, at least at a surface thereof, and has a bending stiffness that is low enough to enable said tube to bend without kinking, and a torsion stiffness that is high enough to enable said tube to assume a shape and a position that are substantially reproducible at least in the closed state.

2. A disconnection device according to claim 1, wherein the flexible tube has a minimum allowable radius of curvature that is less than or equal to three times the outside diameter of the flexible tube.

3. A disconnection device according to claim 1 or claim 2, in which the moving contact is built around a first axis, wherein each end of the flexible tube is fixed along a second axis that is substantially parallel to or that coincides with the first axis, the two second axes being offset relative to each other.

4. A disconnection device according to claim 1, wherein the flexible tube has a length that is greater than a distance between a point at which the flexible tube is fixed to the moving contact and a point at which the flexible tube is fixed to the electrical circuit portion when the pair of contacts is in the closed state.

5. A disconnection device according to claim 1, wherein the outside diameter of the flexible tube lies approximately in the range 10 mm to 60 mm.

6. A disconnection device according to claim 1, wherein the moving contact is built about an axis, and wherein the movement of the moving contact is directed along its an axis thereof.

7. A disconnection device according to claim 1, wherein the flexible tube has a flexible tubular body and an outer sheath made up of interlaced wires.

8. A disconnection device according to claim 7, wherein the flexible tubular body is made of metal.

9. A disconnection device according to claim 7, wherein the flexible body is corrugated.

10. A disconnection device according to claim 7, wherein the sheath is made of metal.

11. A disconnection device according to claim 7, wherein the flexible tubular body is made of a plastics material.

12. A disconnection device according to claim 7, wherein the flexible body is covered with a conductive layer.

13. A disconnection device according to claim 1, wherein at least one of the ends of the flexible tube is equipped with a fixing fitting.

14. A disconnection device according to claim 13, wherein the fitting is a screw-on fitting.

15. A disconnection device according to claim 13 or claim 14, wherein the fitting is provided internally with a pivotally mounted bushing.

16. A disconnection device according to claim 1, wherein the moving contact is built about an axis, and wherein the movement of the moving contact is directed perpendicularly to an axis thereof.

17. A disconnection device according to claim 6, wherein the moving contact is mounted on a dielectric support, and wherein the support is a cylindrical bar suitable for being moved along an axis thereof.

18. A voltage transformer according to claim 1 having at least one set (W) of windings inside an enclosure, wherein said voltage transformer contains a disconnection device.

19. A voltage transformer according to claim 18, which comprises displacement means for displacing the moving contact, said displacement means being accessible from the outside of the enclosure.

20. A voltage transformer according to claim 18 or claim 19, wherein the transformer is a single-phase transformer.

21. A voltage transformer according to claim 18 or claim 19, wherein the transformer comprise a multi-phase transformer.

22. A gas-insulated electricity substation, which comprises, inside a gastight enclosure, an electrical circuit including at least one voltage transformer according to claim 1, a portion of the gastight enclosure serving as an enclosure for the voltage transformer.

23. A gas-insulated electricity substation according to claim 22, wherein the other contact of the pair of the disconnection device is a fixed contact mounted on a dielectric partition which separates the portion of the gastight enclosure that serves as an enclosure for the voltage transformer from the rest of the gastight enclosure, said fixed contact being connected to the rest of the electrical circuit.

* * * * *